Jan. 7, 1964      R. A. MATTHEWS      3,116,760
COMPOSITE TUBING
Filed Aug. 30, 1962      5 Sheets-Sheet 1
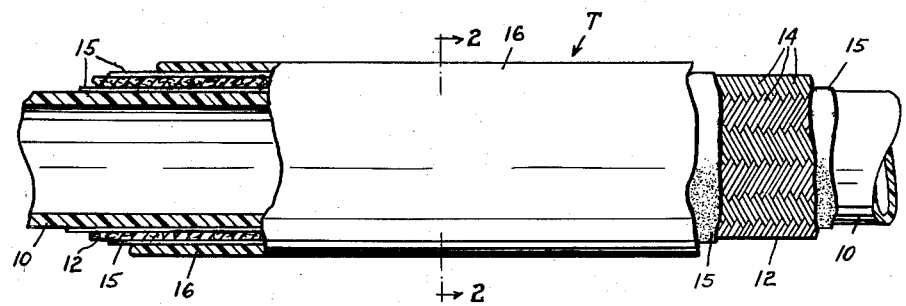
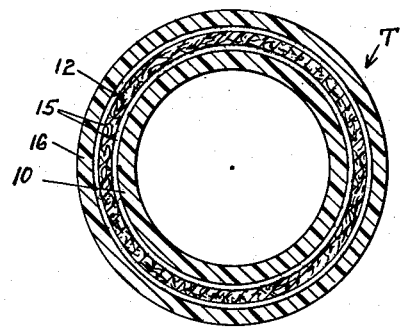
INVENTOR.
RICHARD A. MATTHEWS
BY
Teare, Tetzer + Teare
ATTORNEYS Jan. 7, 1964 R. A. MATTHEWS 3,116,760
COMPOSITE TUBING
Filed Aug. 30, 1962 5 Sheets-Sheet 2
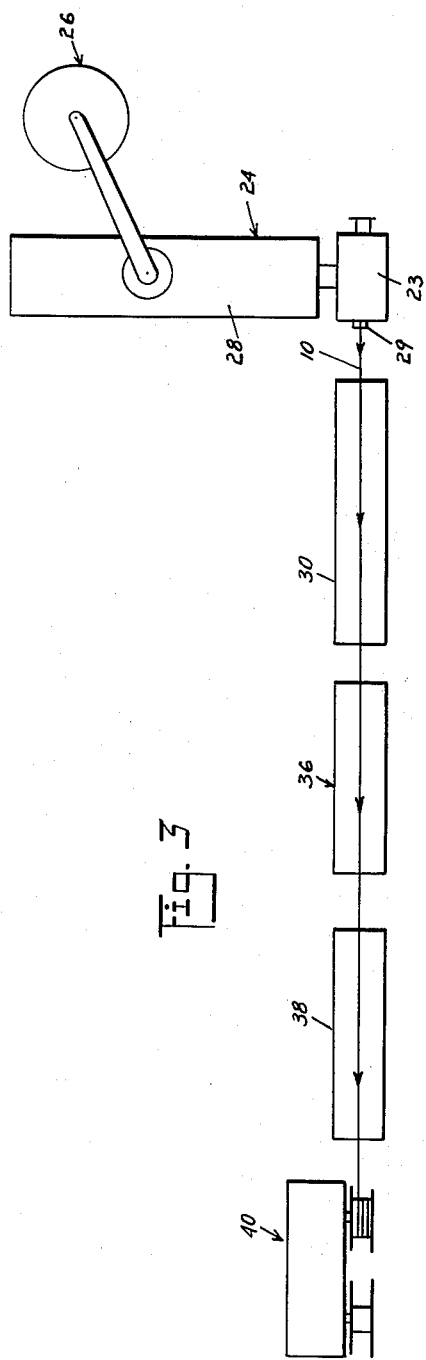
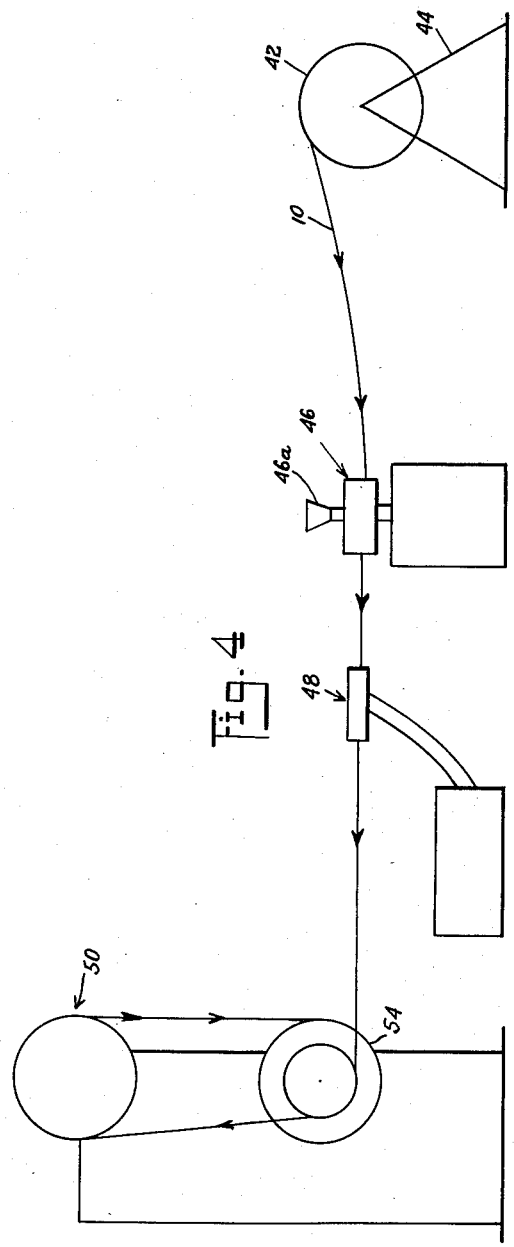
INVENTOR.
RICHARD A. MATTHEWS
BY
Teare, Fetzer & Teare
ATTORNEYS

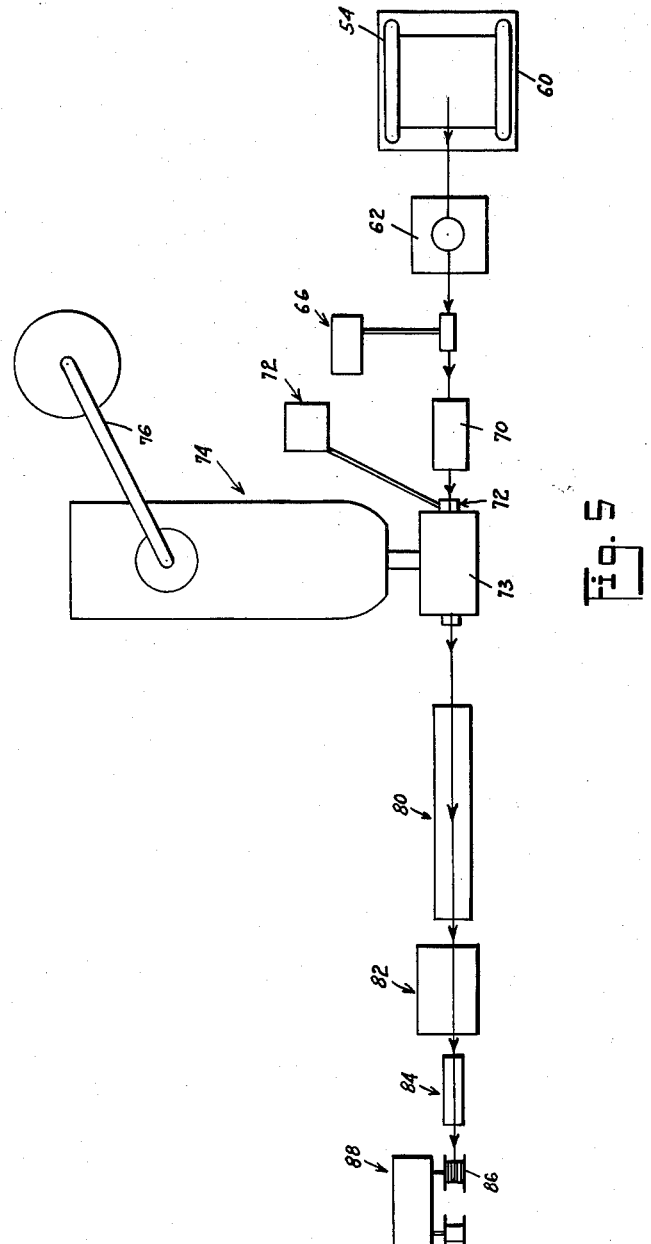

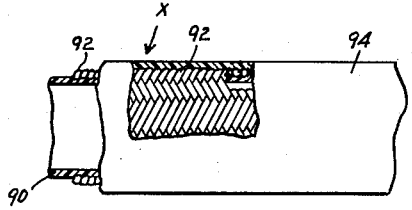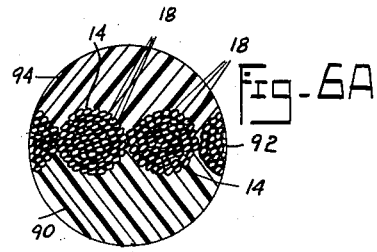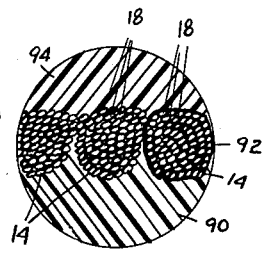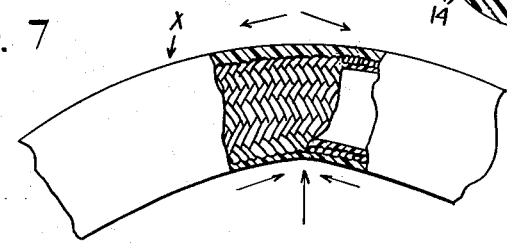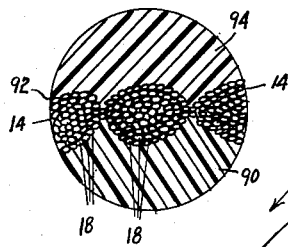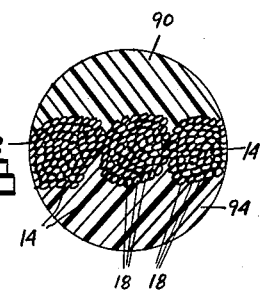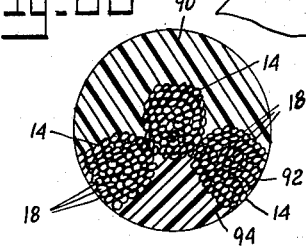

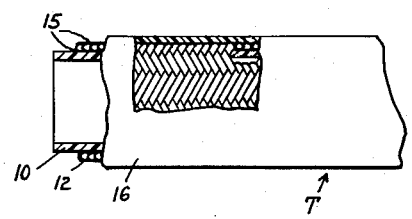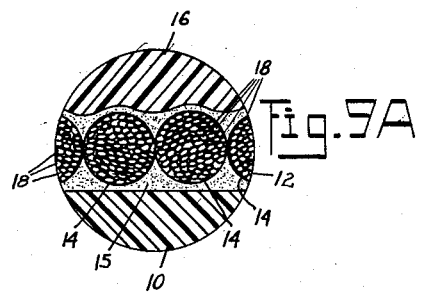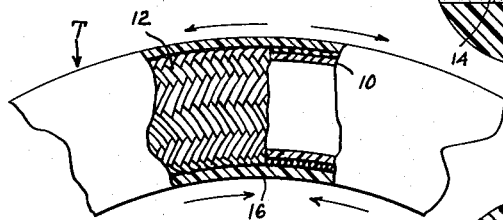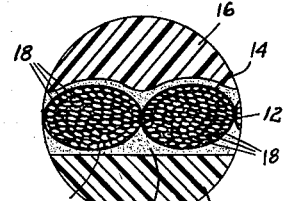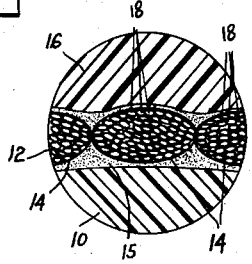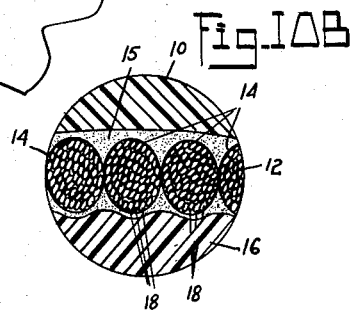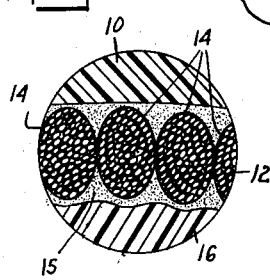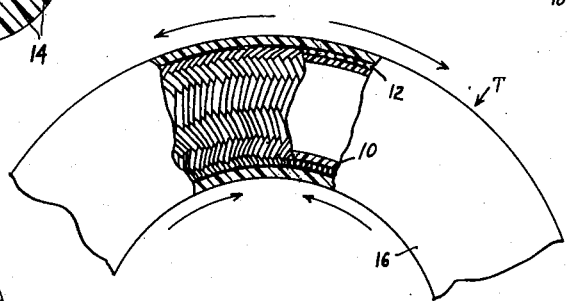

United States Patent Office 3,116,760
Patented Jan. 7, 1964

3,116,760
COMPOSITE TUBING
Richard A. Matthews, Chagrin Falls, Ohio, assignor to Samuel Moore & Co., Mantua, Ohio, a corporation of Ohio
Filed Aug. 30, 1962, Ser. No. 220,531
10 Claims. (Cl. 138—125)

This invention relates in general to composite tubing and more particularly to reinforced, composite plastic tubing, for conveying pressurized fluid.

In the United States patent application of Robert E. Brumbach, Serial No. 827,535, filed July 16, 1959, now Patent 3,062,241, issued November 6, 1962, there is disclosed a composite plastic tubing comprising an inner tube of nylon, at least one layer of fibrous reinforcing material disposed about the inner tube and forming a reinforcing member therefor, and an outer sheath of nylon covering the reinforcing material. Such a composite nylon tubing provides a high strength product, useful under a wide variety of environmental settings, including the earth moving field, and the spraying equipment field, wherein relatively high hydraulic pressures are utilized for conveying fluid through operating lines. However, this nylon tubing has certain weaknesses which stem primarily from the crystalline nature of the nylon resin.

First of all, such tubing possesses somewhat lesser flexibility and limpness as compared to that optimumly desirable for pressure hoses in at least certain environmental settings, and secondly, such tubing is subject somewhat to "crimping" which once incurred in a length of tubing, represents a permanent area or point of deformation on subsequent flexure of the tubing.

The instant invention provides a high strength composite plastic tubing product having a considerably greater flexibility and resistance to "crimp" as compared to heretofore known arrangements for high strength plastic tubing, such as for instance the aforementioned nylon tubing, and especially under a wide range of temperature and pressure conditions.

Accordingly, an object of the invention is to provide an improved high strength composite plastic tubing, for conveying fluid under relatively high pressure.

Another object of the invention is to provide a high strength composite tubing which has increased flexibility and crimp resistance characteristics under varying temperature and pressure conditions, as compared to heretofore known arrangements of plastic tubing.

A still further object of the invention is to provide a high strength composite plastic tubing comprising an inner tube of a polyurethane elastomer, at least one layer of fibrous or strand material disposed about said inner tube and providing a reinforcing member therefor, and an outer sheath or layer of a polyurethane elastomer covering said reinforcing layer, with an elastomeric polyurethane adhesive encapsulating the reinforcing member and bonding the latter to both the inner tube and the outer sheath.

Other objects and advantages of the invention will be apparent from the following description taken in conjunction with the accompanying drawings wherein:

FIG. 1 is a partially sectioned and partially cutaway view of a composite tubing product produced in accordance with the instant invention;

FIG. 2 is a transverse, cross sectional view taken generally along the plane of line 2—2 of FIG. 1, looking in the direction of the arrows;

FIG. 3 is a more or less diagrammatic, top plan view of an apparatus disposed in an organized system for producing the elastomeric polyurethane inner tube of the composite tubing product;

FIG. 4 is a more or less diagrammatic, side elevational view of apparatus disposed in an organized system for taking the inner tube, produced by the apparatus of FIG. 3, and applying an adhesive thereto, and then applying, such as by braiding, reinforcing material about such inner tube, and resulting in bonding of the reinforcing material to the inner tube;

FIG. 5 is a more or less diagrammatic, top plan view of apparatus disposed in an organized system for taking the inner tube with the reinforcing material adhered thereto, from a payoff reel, and extruding thereover the outer sheath of elastomeric polyurethane material, to form the bonded composite tubing product of the invention;

FIGS. 6, 7 and 8 are respectively views of a known composite plastic tubing, and more particularly a plastic tubing formed from an inner tube of nylon, intermediate braided reinforcing material, and an outer nylon sheath, and with such tubing being disposed in respectively a straight line or axial condition, a partially bent condition, and a more fully bent condition;

FIG. 6A is a highly magnified sectional illustration of the condition of the layers of the materials forming the composite tubing of FIGS. 6 through 8 when the latter tubing is in the straight line condition of FIG. 6;

FIGS. 7A and 7B are views similar to that of FIG. 6A, but illustrating the condition of the layers when the tubing is in the FIG. 7 partially bent condition, with FIG. 7A being taken from the top side of the FIG. 7 tubing, while FIG. 7B is taken from the underside of the FIG. 7 tubing;

FIGS. 8A and 8B are views similar to FIGS. 7A and 7B, respectively, but illustrate the condition of the layers when the tubing is in the FIG. 8 condition;

FIGS. 9, 10 and 11 are views corresponding to those of FIGS. 6, 7 and 8, respectively, but showing the same condition of a composite plastic tubing formed of the elastomeric polyurethane inner tube, an intermediate braided reinforcing material, and an elastomeric outer polyurethane sheath, in accordance with the instant invention;

FIGS. 9A, 10A, 10B, 11A and 11B are magnified views of the FIGS. 9 to 11 tubing, and correspond generally to FIGS. 6A, 7A, 7B, 8A and 8B, respectively.

Referring now again to the drawings, and more particularly to FIGS. 1 and 2 thereof, there is shown a piece of plastic, composite tubing T, comprising an inner tube or core 10 formed in accordance with the invention, of elastomeric polyurethane, such inner tube being adapted to carry the flow of fluid therethrough. Surrounding the inner tube is a fibrous reinforcing sleeve member 12 comprising a plurality of strands or "yarns" 14, as it is known in the art, which in the embodiment illustrated have been machine braided about the inner tube, using a regular weave. A specially formulated elastomeric polyurethane adhesive 15 is utilized, which adhesive capsulates the strands of the reinforcing material, and bond such reinforcing sleeve to the inner tube. Superimposed over the reinforcing member or sleeve 12 is an extruded, outer sheath 16 of elastomeric polyurethane, which is bonded to the reinforcing material and to the inner tube by the aforementioned layer of elastomeric adhesive, the latter mentioned arrangement providing a high strength composite tubing product possessing very good flexibility and good crimp resistance characteristics.

The extrudible polyurethane resins which are useable in this arrangement of composite plastic tubing are commercially represented by a blend of "Texin" compounds marketed by the Mobay Chemical Company, of Pittsburgh, Pennsylvania. These "Texin" compounds are chemically the reaction products of a hydroxy terminated polyester with diphenylmethane diisocyanate, to form a prepolymer which is then chain extended with a poly-hydroxy compound to produce a cured resin. The proportions of "Texin" used to form the blended polyurethane elastomer for both the inner tube 10 and the outer sheath 16 may be varied over a range of 20% Texin 480A and 80% Texin 355D to 80% Texin 480A and 20% Texin 355D. A proportion that has been found to be especially satisfactory has been a blend of 60% Texin 355D and 40% Texin 480A.

The property characteristics of the aforementioned Texin 480A are generally as follows:

| | |
|---|---|
| Tensile strength in p.s.i. | 7000 |
| Elongation, percent | 600 |
| Hardness-Shore | 80 |

The similar properties for Texin 355D are:

| | |
|---|---|
| Tensile strength, p.s.i. | 4000 |
| Elongation, percent | 250 |
| Hardness-Shore | 55 |

The strand material for the reinforcing member 12 is preferably composed of polyester filaments, such as poly (alkylene terephthalate) ester fiber or more specifically poly (ethylene terephthalate) ester fiber, commonly available under the trade name "Dacron," or of polyamide filaments, such as nylon. The strengthening member 12 is also preferably of the braided type illustrated and the individual strands or "yarns" of the braided material are preferably of the floss-type with each formed of a substantial plurality of filaments 18 (FIGS. 6 to 11B) which are movable with respect to one another. Other suitable fiber materials, other than those aforementioned, such as high tenacity rayon, might be used for the reinforcing sleeve, so long as such other materials are of a relatively high strength nature. The strands 14 of braided material are disposed in tensioned relation about the inner tube, thereby insuring as little volumetric expansion of the tubing as possible during the conveying of fluids therethrough.

The polyurethane adhesive, which is used for encapsulating the strengthening or reinforcing braided sleeve 12, and for bonding the latter to both the inner tube 10 and to the outer sheath 16 preferably has the following approximate composition:

| | Percent |
|---|---|
| Prepolymer | 89.2 to 93.3 |
| Chain extender | 5.6 to 9.8 |
| Catalyst | 1.0 to 1.2 |

The preferred prepolymer for the above mentioned adhesive composition is known commercially as Adiprene L100 which is a product of the E. I. du Pont Chemical Corporation.

The preferred chain extender is known commercially as "Moca" and which is again a product of E. I. du Pont Co. This "Moca" is chemically P, P' methylene bis (O-chloroaniline).

A suitable reaction catalyst is adipic acid, although other dibasic acids will exercise a similar effect. Examples of some of such other dibasic acids which could be used as catalysts are oxalic, malonic, succinic, glutaric, sebacic, etc. The adhesive, being a two-part catalyzed system, has a relatively short pot life, and therefore is preferably mixed within a few minutes before application to the hose. Application of the latter adhesive will be hereinafter described in greater detail.

In the final cured state of the adhesive, the elasticity and flexibility thereof physically enclosing or encapsulating the individual braided strands, controls the degree of motion and slippage of the filaments of each of said braids or strands within the polyurethane resin adhesive envelope.

Another adhesive which may be utilized in the production of the composite plastic tubing of the invention and which gives satisfactory results consists of approximately 65% by weight of F66, 30% by weight of Nalco 1718, and approximately 5% tall oil. F66 is a prepolymer similar in certain respect to Adiprene L100 but manufactured by the Mobay Chemical Co. Nalco 1718 is a polyhydroxic compound manufactured by the National Aluminate Co.

In the mixture of the adhesive materials, the prepolymer is actually the basis or backbone of the cured polymer. It is called a prepolymer because it is a partially polymerized material consisting of two monomeric substances. However, its molecular weight is such that it is still in a liquid state, and there is no resemblance to a cured plastic. When the chain extender and the catalyst are added to the prepolymer, the length of the chain is increased which in turn increases the molecular weight of the plastic compound, such that it turns into a solid state and produces the properties desired. Although it is not specifically known, it is believed that a small amount of cross linking between the backbone chains does occur. The amount of cross linking is very small or else the polymer would turn into an insoluble and infusible mass, thereby losing its flexibility and elasticity which flexibility and elasticity as aforementioned provides for the controlled slippage of the individual filaments within each braid or strand, and within the polyurethane resin envelope encapsulating each strand.

The outer sheath of the composite plastic hose is formed of the same general composition as utilized in the production of the inner tube of the composite hose.

The wall thicknesses of the respective sections of material forming the composite tubing of the invention have been found to be preferably as follows: For a ⅜ inch internal diameter hose, the wall thickness of the inner tube 10 should preferably be within the range of .030 to .050 inch and with such size of tubing, the preferable thickness of the outer sheath 16 should be within the range of .025 to .040 inch. The approximate overall dimension or thickness of the wall of the composite tubing is preferably from about .090 inch to .125 inch. This thickness, of course, presupposes an integral construction in accordance with the teachings of the invention whereby the various components of the wall are held or bonded together by the elastomeric adhesive material 15.

Referring now to FIG. 3, there is diagrammatically shown apparatus in an organized system for producing the inner tube 10 of the composite tubing. Such inner tube may be formed by extrusion, and the extrusion of such inner tube with its relatively thin wall may present support problems, and therefore in accordance with the instant invention, an internal air pressure of predetermined value is maintained in the tubing as it is extruded from the cross head 23 of extrusion machine 24.

The extrusion machine may be of a more or less conventional type, but embodying a hopper drier unit 26, and extrusion mechanism 28 which forces the heated polyurethane material out of the die orifice 29 of the head. An internal air pressure control unit (not shown) which is known in the art, may be provided for maintaining the aforementioned air pressure interiorly of the inner tube, as it is extruded from the head. Reference may be had to the copending United States patent application of Robert E. Brumbach, Serial No. 124,448, filed July 17, 1961, in which there is a disclosure of an air control unit and associated mechanism, for applying internal air pressure to a plastic tube during the extrusion thereof.

From head 23, the length of extruded inner tube is moved through a relatively short water bath 30 for quenching the hot tube, and thus substantially "setting" it, thereby preventing elongation or stretching of the core tube. The tube may be taken from the water bath 30 by means of any suitable haul off device 36, which may be of the known powered caterpillar type, and then it is moved into a second water tank 38 for further cooling the tubing. After passing through the cooling water bath 38, the tubing may be wound upon a windup or reel mechanism 40 of conventional construction, and thus be placed in coil form on such mechanism.

Referring now to FIG. 4, a reel 42 of the extruded elastomeric polyurethane inner tubing 10 may be mounted on a payoff stand 44 of conventional well known type, and as for instance illustrated in the aforementioned pending patent application Serial No. 124,448, and the core tubing is passed through an adhesive applicator 46 which, as illustrated in FIG. 4, may embody a funnel portion 46a. Reference may be had to the aforementioned pending patent application Serial No. 124,448 for a more detailed description of a suitable applicator. The tubing may be then passed through a conventional drier unit 48 which for instance, by use of hot air, may expedite the "gelling" of the adhesive material on the inner tube to aid in the "setting" of the adhesive layer 15 on the inner tube. However, the drier unit may be eliminated from the mechanism arrangement, and is not absolutely necessary when the adhesive is of the catalyzed composition aforedescribed.

From the drier 48, the adhesive coated inner tube may be passed to a braiding mechanism 50 which may be of any conventional type, many of which are known in the tubing art. After the core tube has been braided with one or more layers of reinforcing material, it may be wound upon a reel 54 for further handling. The inner tubing, instead of being provided with a braided layer of reinforcing material, could be provided with a served or taped type of reinforcement, it being understood that there are many mechanisms available in the tubing art for applying such taped or served reinforcement to the exterior of a tubing. The only requirement is that the taped reinforcement be comprised of strands or "yarn" of multiple filaments 18, as aforediscussed.

By employing the proper interval of time in conjunction with the drier 48, this interval of time being relatively short, such as approximately 15 seconds to two minutes, between the application of the adhesive to the inner tube and the application of the reinforcement material 12 to the adhesive, the liquid adhesive is in a substantially gel state at the time the braid or reinforcing sleeve is applied over it. Such adhesive will advance to a final cured state on merely standing at room temperature for a period of 24 to 72 hours. However, by exposing the composite tubing to an elevated temperature, such as for instance from 150° F. to 250° F. from 8 to 24 hours, the cure may be hastened.

The viscosity of the adhesive during its application to the inner core may be within the range of 1000 to 100,000 centipoises. However, the preferred range is from 5000 to 20,000 centipoises and this is at a temperature of from 70° F. to 225° F. of the adhesive, with a preferred temperature range of the adhesive at application to the inner tube being within the range of 125° F. to 200° F. The adhesive, because of its viscosity, is not absorbed into the braids or strands 14 of material, but encapsulates such braids or strands, and may pass through the interstices between the braids or strands. After the reinforcing member has been applied to the core tube, and before the adhesive material has cured, or in other words relatively shortly after application of the braid 12, the braided and adhesive coated inner tube is then applied to an extruder for application of the smooth outer elastomeric polyurethane sheath thereto.

Referring to FIG. 5, there is shown a payoff stand 60 with a reel 54 of the braided tubing thereon, being fed through an adhesive applicator mechanism 62 which may be of the aforementioned type described in connection with FIG. 4. From adhesive applicator mechanism 62, the braided tubing which is now coated with a liquid polyurethane elastomeric adhesive from applicator 62, may pass through a conventional, blower operated air drier unit 66.

A tension device 70, which may be of the conventional well known wheel type, may be provided for maintaining a constant tension on the stretch of braided and adhesive coated tubing as it is pulled off the payoff reel 54. The tubing may then be passed into a vacuum apparatus 72 of well known conventional type for insuring the proper size or thickness of the adhesive coating on the braids of the strengthening material, and thus insuring proper operating characteristics of the tubing as it passes through the cross head 73 of extruder mechanism 74, which extruder mechanism is adapted for applying the outer sheath 16 of elastomeric polyurethane material to the composite tubing.

Extruder mechanism 74 includes a drier hopper unit 76 for drying the elastomeric polyurethane material prior to extrusion thereof onto the tubing. This predrying preferably occurs for a minimum of one hour at approximately 200° F. At head 73 of the extruder mechanism 74, the outer sheath 16 is applied to the tubing and is adhered by the adhesive coating 15 encapsulating the reinforcing member 12 of the tubing.

From extruder head 73, the sheathed tubing is passed through a water bath 80 which quenches and cools the heated tubing. Haul off mechanism 82 which may be of the aforedescribed caterpillar type, may draw the tubing from the water bath 80 and from the extruder head 73.

The tubing may then be passed through a conventional marking mechanism 84 which is well known in the art for applying a trademark and/or other identifying indicia to the sheath of the tubing product. The tubing may then be wound upon a reel 86 of coiler mechanism 88, and may be stored for subsequent use or shipping. As aforementioned, the adhesive will advance to a final cured state on standing at room temperature for a period of from 24 to 72 hours, or the cure may be hastened by the use of an elevated temperature exposure to the tubing, such as for instance 150° to 250° F. for a period of from 8 to 24 hours.

Once the manufacturing process has been started, it may be a substantially automatic process wherein all of the aforedescribed apparatuses could be set out in a continuous system for passage of the component material parts of the tubing from one apparatus to the next, and in a continually operating process, for the automatic production of the tubing. It will be seen, therefore, that even though the apparatus for producing the product has been illustrated and described in more or less sectional units, comprising first the production of the inner core 10 and then the production of the braided or reinforcing material 12 bonded to the inner core, and then the production of the outer sheath 16 bonded to the reinforcing material of the tubing, that the process could be performed in one continuous straight lined arrangement.

Referring now to FIGS. 6 to 11B inclusive, there is illustrated in FIGS. 6 through 8 and FIGS. 6A through 6B, various conditions of a known plastic composite tubing X comprising an extruded nylon inner tube 90, a braider layer of fibrous reinforcing material 92 disposed in generally tensioned relation around said inner tube, and an outer sheath 94 of extruded nylon material encasing the inner tube and reinforcing material. This tubing is of the general type disclosed in aforementioned United States patent application Serial No. 827,535. It has been a practice in the FIGS. 6 to 8 tubing to secure the braided material 92 to the core tube 90 and to the sheath 94 to enhance the strength characteristics, by softening the surface of the nylon inner tube 90 and of the sheath, by means of a chemical solvent for nylon. Some such materials which may function in this capacity are phenol, various cresols, cresylic acid, or solutions of resorcinol. These materials create a generally, soft sticky condition on the surface of the nylon, and when the braid is applied under tension, it tends to bury itself into the confronting soft surface layer of nylon, which actually is nylon in solution, and when the solvent evaporates, there is a firm joining of the braid to the surface of the nylon. However, the braid is generally immobilized under these conditions, and it is not free to flex in tension or compression when the tubing is bent, since the solventized nylon has generally penetrated the strands 14 and substantially immobilized the filaments thereof.

It can be seen from FIG. 6A, the individual strands or yarns 14 of strengthening material are comprised of a multitude of filaments 18, such as for instance a 1100 denier Dacron yarn, and with such yarns or strands 14 being imbedded in both the inner core 90 and the outer sheath 94 due to the action of the aforediscussed solvent. Upon partial bending of such a hose construction, as shown, for instance, in FIGS. 7, 7A and 7B, the strands cross sections on the upper and undersides of the tubing, which are under tension and compression respectively, may become distorted as shown, and since the outer filaments of each yarn are embedded in intimate contact with the confronting crystalline nylon material, and the filaments are generally immobilized against movement with respect to one another, such filaments are stretched and distorted out of normal position with respect to the other filaments of the respective yarn or strand, and the hose assumes a slight oval shape in cross section. This is primarily because the filaments of each strand are not readily movable, but instead are immobilized by such embedded condition in the adjacent nylon material, and the filaments are immobilized by the penetration of the solvent into the strands.

Upon a greater bend of the prior art hose, as shown for instance in FIGS. 8, 8A and 8B, and because the filaments 18 of strands 14 have substantially no longitudinal slide with respect to one another, and the fused structure prevents compression of the strands or yarn without inducing a linear pull with regard to the core tube 90, a crimping force is induced in the tubing, and the latter crimps, as at 100, to cause a more or less permanent area of creasing to be induced in the tubing, and thus setting up a location of future failure in the tubing.

Now referring to FIGS. 9 to 11B, in the straight condition of a piece of tubing of the instant invention, it will be seen that the yarns or strands 14 of the braided material are of generally circular configuration, and are completely encapsulated in the elastomeric polyurethane adhesive layer 15. Upon partial bending of the elastomeric tubing, as shown in FIGS. 10, 10A and 10B, the yarn cross sections become longitudinal ellipses on the upper side of the hose (FIG. 10A) as the filaments 18 move in an orderly manner with regard to one another, due to the non-penetration of the adhesive and also to the elasticity of the polyurethane adhesive layer 15 and the elasticity of the inner tube 10 and outer sheath 16, and on the lower side, such yarn cross sections form a generally vertically elliptical condition (FIG. 10B) due to compression forces on such side. Since the strands 14 are encapsulated or embedded in the elastomeric adhesive, and the adhesive gives or moves with the compression and tension of the tubing, and the filaments of each braid or strand 14 are generally free to move with respect to one another, the strands 14 in an orderly manner absorb the forces being applied to the tubing wall.

Upon greater flexure of the tubing, as shown in FIG. 11, the filaments slide in a more or less circumferential direction with respect to the core tubing, and longitudinally with regard to the respective braid or strand, and thus form greater elliptical configurations of cross section, as shown in the enlarged sections, FIGS. 11A and 11B, of such view, and without any crimping occurring.

Tests have been performed on the composite tubing of the invention as compared to known composite plastic tubing, and for instance the type disclosed in aforementioned copending patent application Serial No. 827,535. Samples of the type of said patent application and that of the instant application were supported in a flexing test device, and wherein the hose in each sample was bent into a U-shape configuration having approximately one and a half inch radius. Tests were performed on one-quarter inch and on three-eighths inch internal diameter hoses. With a composite tubing of nylon-braid-nylon construction, a force of 12 to 14 pounds was required to bend a one-quarter inch internal diameter hose. The same size of hose in the polyurethane construction of the instant application required merely a force of 5 to 7 pounds. In a three-eighths inch I.D. hose of the nylon tubing, a force of 22 to 25 pounds was required to bend the piece of such tubing into a one and a half inch radius. With the polyurethane tubing of the instant invention, only 14 to 16 pounds of force was required. It will be seen therefore that the instant tubing has considerably greater flexibility as compared to prior art arrangements of high strength composite plastic tubing.

Also, the crimp resistance of the tubing of the instant invention was compared with that of the aforementioned nylon construction of tubing, and it was found that in a six inch long piece of the one-quarter inch I.D. nylon tubing, which was bent into a U, a kink or crimp appeared in the tubing upon movement of the ends of the tubing within three inches of one another. In one-quarter inch I.D. polyurethane tubing of the instant invention, no kinks whatsoever appeared in the tubing even when the ends were bent into contact.

The notch sensitivity of the instant tubing is much lower than that of, for instance, composite nylon tubing, because nylon is extremely sensitive to notching, especially when the nylon is dry. In tests comparing the burst strength of the instant polyurethane tubing as compared to that of the nylon tubing, the strengths were generally equivalent to one another. It will be seen, therefore, that applicant's tubing arrangement while possessing much greater flexibility and resistance to crimp as compared to for instance the nylon tubing, has the equivalent strength characteristics of the composite nylon tubing.

From the foregoing description and accompanying drawings it will be seen that the invention provides a novel composite tubing product comprising an elastomeric polyurethane inner tube, a fibrous strengthening member surrounding the inner tube and reinforcing the same, and an outer sheath of elastomeric polyurethane material with an elastomeric polyurethane adhesive encapsulating the strengthening member and bonding the latter to the inner tube and to the outer sheath, and with such tubing product having greater flexibility as compared to prior art arrangements of composite plastic high strength tubing, and possessing good crimp resistance characteristics.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

I claim:
1. A high strength composite tubing having good flexibility and crimp resistant characteristics comprising, an inner tube of elastomeric polyurethane material, at least one layer of fibrous material disposed about said inner tube and forming a reinforcing member, an elastomeric polyurethane adhesive bonding said reinforcing member to said inner tube, and an outer sheath of elastomeric polyurethane material covering said reinforcing member, said adhesive bonding said outer sheath to said reinforcing member and to said inner tube.

2. A composite tubing in accordance with claim 1 wherein said adhesive initially comprises a prepolymer, a chain extender, and a reaction catalyst, said adhesive physically enveloping the individual strands of said reinforcing member, each of said strands comprising a plurality of filaments, said adhesive possessing elasticity and flexibility to permit controlled movement of the filaments of each of the strands wtihin its respective adhesive envelope.

3. A composite tubing in accordance with claim 2, wherein said prepolymer comprises from about 89% to 93% by weight of the adhesive composition, said chain extender comprises 5.6% to 9.8% and said reaction catalyst comprises 1.0% to 1.2%.

4. A composite tubing in accordance with claim 1, wherein each of the strands of said fibrous material comprise a plurality of filaments, said strands being of a floss-type, and said adhesive encapsulating said reinforcing member.

5. A composite tubing in accordance with claim 4, wherein the wall thickness of said inner tube and said outer sheath are approximately equal.

6. A composite tubing in accordance with claim 4, wherein said strands are comprised of polyester filaments.

7. A composite tubing in accordance with claim 4, wherein said strands are comprised of polyamide filaments.

8. A composite tubing in accordance with claim 4, wherein said strands are comprised of high tenacity cellulosic filaments.

9. A high strength composite tubing in accordance with claim 1, wherein the wall thickness of said inner tube is within the range of .03 to .050 inch and the wall thickness of said outer sheath is within the range of .025 to .040 inch, and the composite wall thickness of said tubing is within the range of 0.90 to .125 inch.

10. A high strength composite tubing having good flexibility and crimp resistance characteristics comprising a relatively thin walled inner tube of elastomeric polyurethane, at least one layer of poly (ethylene terephthalate) ester strands disposed in braided, tensioned condition about said inner tube and forming a reinforcing member, an elastomeric polyurethane adhesive encapsulating each of the strands of said reinforcing member and bonding said reinforcing member to said inner tube, each of said strands including a plurality of relatively movable filaments and being of a floss type, an outer sheath of elastomeric polyurethane material covering said reinforcing member, said adhesive being disposed intermediate said reinforcing member and said sheath and bonding the latter together, said adhesive existing solely on the exteriors of said strands.

References Cited in the file of this patent

UNITED STATES PATENTS

| | | |
|---|---|---|
| 2,262,514 | Pape | Nov. 11, 1941 |
| 2,788,804 | Larkin | Apr. 16, 1957 |
| 3,033,729 | Shobert | May 8, 1962 |
| 3,062,241 | Brumbach | Nov. 6, 1962 |

UNITED STATES PATENT OFFICE
CERTIFICATE OF CORRECTION

Patent No. 3,116,760            January 7, 1964

Richard A. Matthews

It is hereby certified that error appears in the above numbered patent requiring correction and that the said Letters Patent should read as corrected below.

Column 9, line 25, for "0.90 to .125 inch." read -- .090 to .125 inch. --.

Signed and sealed this 18th day of June 1968.

(SEAL)
Attest:

Edward M. Fletcher, Jr.
Attesting Officer

EDWARD J. BRENNER
Commissioner of Patents